Feb. 12, 1963   J. A. STIEBER ET AL   3,077,040
METHODS FOR FORMING A COLOR IMPREGNATION OF
TRANSPARENT GEOMETRICAL SHAPES
Original Filed Jan. 16, 1956   2 Sheets-Sheet 1
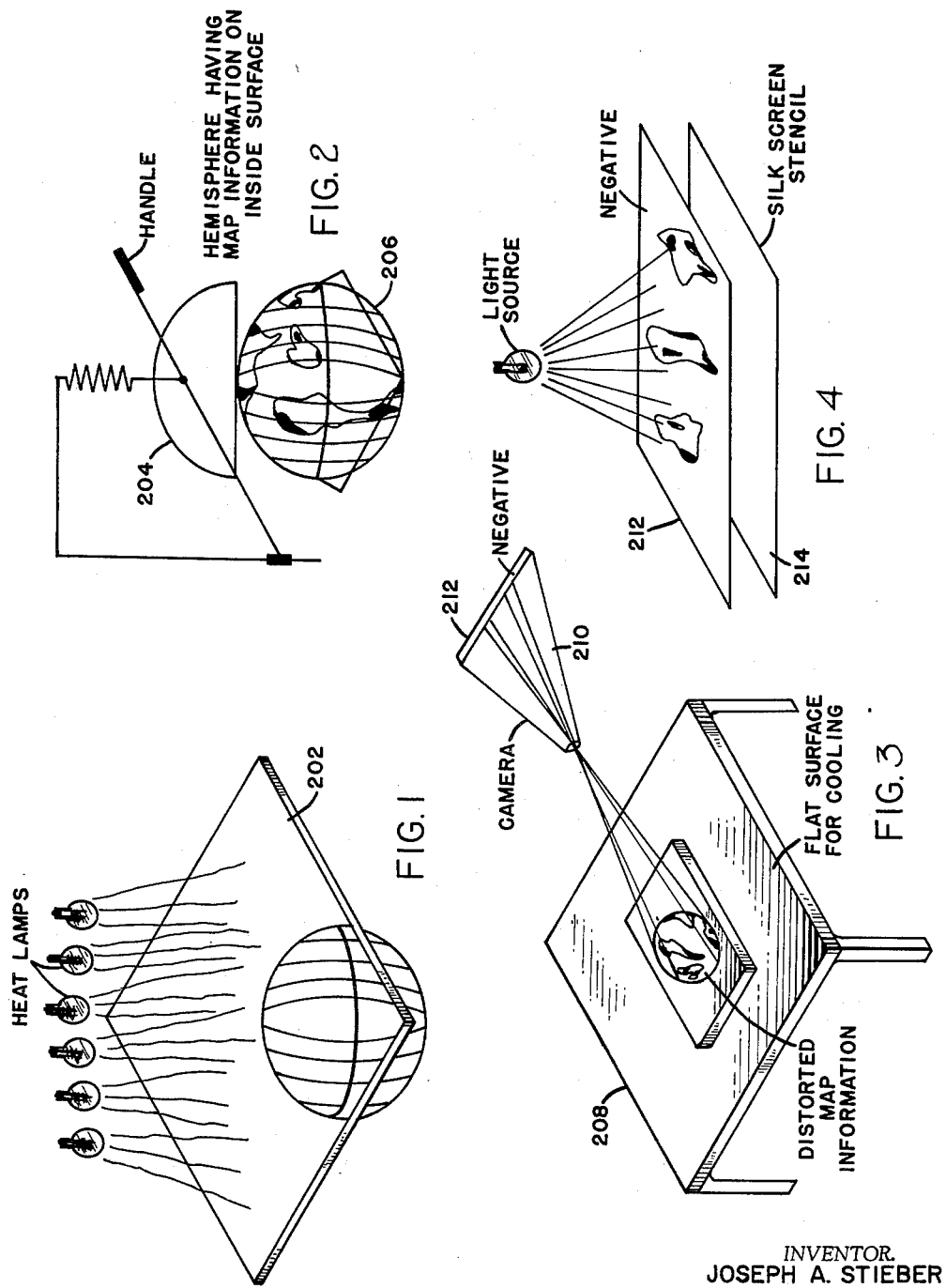
INVENTOR.
JOSEPH A. STIEBER
JOHN B. WELDON
BY
Laurence S. Epstein
ATTORNEYS

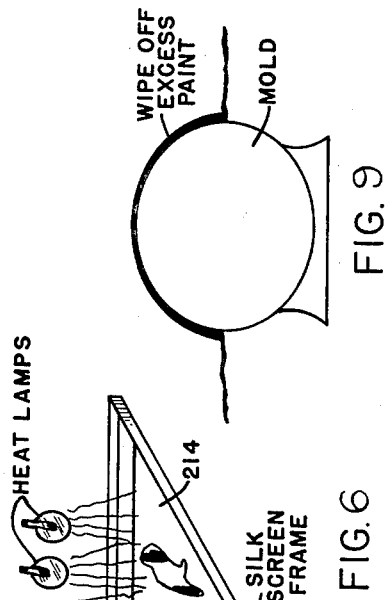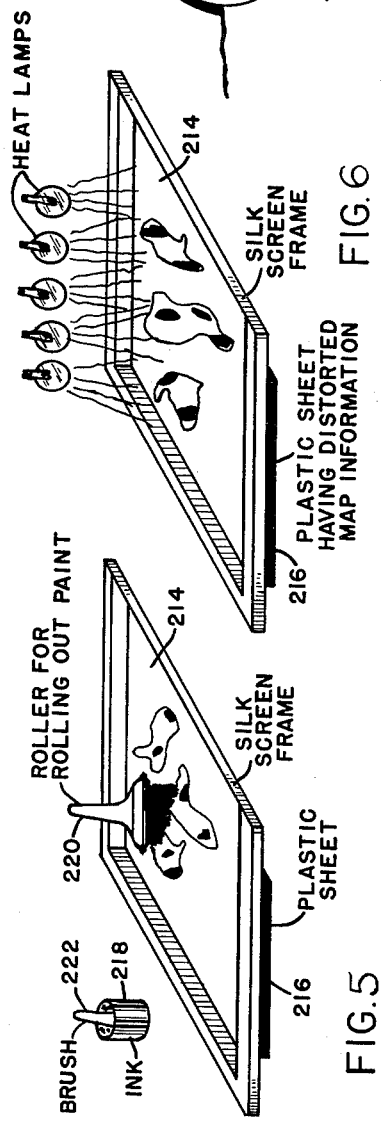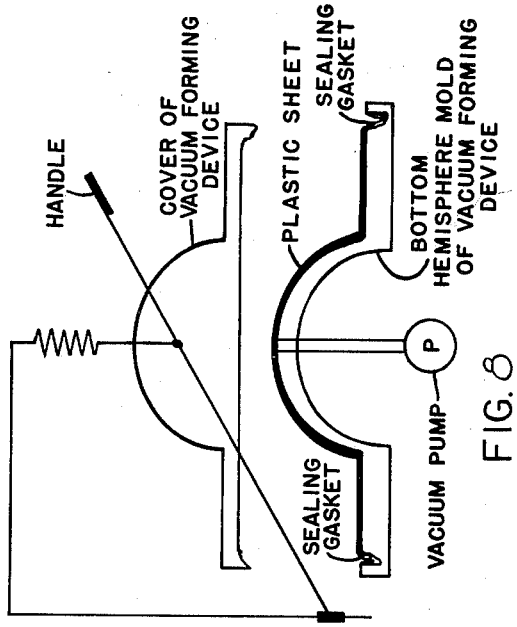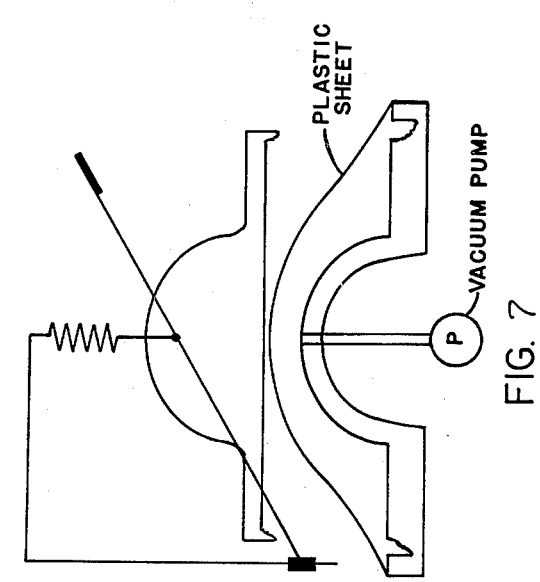

3,077,040
METHODS FOR FORMING A COLOR IMPREGNATION OF TRANSPARENT GEOMETRICAL SHAPES
Joseph A. Stieber, 70 E. St. Mark Place, Valley Stream, N.Y., and John B. Weldon, 2 Williams St., Levittown, N.Y.
Original application Jan. 16, 1956, Ser. No. 559,494, now Patent No. 2,932,907, dated Apr. 19, 1960. Divided and this application Oct. 9, 1959, Ser. No. 850,749
1 Claim. (Cl. 35—46)
(Granted under Title 35, U.S. Code (1952), sec. 266)

The invention described herein may be manufactured and used by or for the Government of the United States of America for governmental purposes without the payment of any royalties thereon or therefor.

This application is a division of Patent No. 2,932,907, filed January 16, 1956, in the name of Joseph A. Stieber and John B. Weldon, entitled "Map Projections Demonstrator" and issued April 19, 1960.

This invention relates to globes and in particular to improvements in processes and means for providing information on the globes to be used in map projection demonstrations.

Transparent globes for teaching and training purposes have long been available, but are not satisfactory for efficient use. Some existing devices are constructed of polystyrene pressure molded material, but are inadequate due to poor coloring and poorly formed bases. Interference with clarity of design and utility thereof is due to ribs formed on the exterior of the globe. The materials used also discolored with age and rendered the globe useless in time. These devices were not suitable for projection because of limited and malformed parts. As a result, a great deal of breakage would occur. Further, provision for addition or removal of elements to illustrate the subject being taught was inadequate and as a result only a few, simple problems could be demonstrated with each globe. It was also conventional to paint geographical data on the exterior of the globe, and it was not possible to directly mark the areas being studied on the globe, without damaging the structure.

The present invention overcomes the inadequacies of the prior art by permanently providing geographical information on the interior or exterior surfaces of the globe as well as by permitting units to be interchangeably mounted thereon for illustration of educational information.

An important object of the invention is to provide a new method for impregnating a transparent material with a dye.

Another important object is to provide a training aid in the visual illustration of a principle, or subject, and is to be used in schools or other educational and training areas.

Another object is to provide a transparent globe able to project map information onto a suitable surface or screen.

Still another object is to provide a globe with a surface able to accept directly temporary marking means so that the demonstration could be readily varied without requiring substitution of several parts.

And still another object is to provide a new method of applying information to the external and interior surface of a hemispherically formed material, whereby greater transparency and better projection is possible.

Other objects and many of the attendant advantages of this invention will be readily appreciated as the same becomes better understood by reference to the following detailed description when considered in connection with the accompanying drawings wherein:

FIG. 1 shows the preferred method of heating the Plexiglas plastic for forming into hemispherical shapes; FIG. 2 shows a means for transferring an outline of the desired map information onto the external surface of the formed Plexiglas; FIG. 3 shows the means to permit the Plexiglas to flatten into its original shape and the reproduction of distorted map information onto film; FIG. 4 shows the method of making the silk screen stencil containing distorted map information; FIG. 5 shows the method for applying paint to the plastic through the silk screen stencil; FIG. 6 shows the method and means for heating the plastic, the silk screen stencil and the paint; FIG. 7 shows a preferred method of deforming the paint impregnated plastic sheet into a hemispherical shape by vacuum means; FIG. 8 shows the deformed hemispherical paint impregnated plastic; and FIG. 9 shows a preferred method of wiping off the excess paint and permitting the permanently deformed hemispherical shape to cool.

Similar numerals refer to similar parts throughout the several views.

Existing methods of forming the hemispherical members of the globes were unsatisfactory because of poor techniques and inadequate versatility. To overcome these limiting features, a new process for forming globes was developed.

In the instant process, a sheet of clear Plexiglas 202 is heated and is formed into a hemisphere of the desired size. At this time an outline of the map information desired is drawn on the deformed Plexiglas sheet by means of a hemisphere 204 which has map information drawn on its inside surface, the deformed Plexiglas being placed on spherical mold 206, after which it is again reheated and allowed to flatten into its original planar shape. A flat surface 208 being utilized for cooling and flattening. Such step is possible because of the memory quality of the Plexiglas used which resumes its original form. The map information on the flat transparent sheet of plastic becomes distorted when it returns to the original form. A drawing for the silk screen stencil is then made. Many known procedures are used to provide the silk screen information, as for example, by photographic reproduction, such as with camera 210 and negative 212 or by means of an etching process to cut out the silk screen stencil 214.

The map information is now ready for application to a globe-half. The silk screen stencil 214 is placed on a flat plastic matrix of Plexiglas 216 or similarly suitable material, either on the exterior or interior surface, and ink 218 in the color selected, is applied. The ink 218 is applied in excess by means of a roller 220 or brush 222. The plastic material with an excess of ink is placed in an oven and is heated to a temperature of from 250°–350° F. The plastic is softened, and impregnation of the ink into the plastic material takes place. While still warm and in pliable condition, the plastic material is placed between two plates having circular openings slightly larger is diameter than the desired shape of the finished hemispherical globe, and the plates are placed over the open side of a vacuum forming chamber. Sufficient vacuum is applied to deform the warm, pliable plastic material into the shape of a hemisphere. This is shown in FIGS. 8 and 9. Additional impregnation of the ink into the plastic continues to occur. A hemispherical plug, slightly smaller in diameter than the desired shape of the finished hemispherical section of the globe is placed within this hemispherical part of the vacuum deformed plastic. The vacuum is then released permitting the plastic to form over the hemispherical plug. The hemispherical plastic sheet with the map information impregnated therein provides a correctly scaled map formed about the exterior surface of the hemispherical plug member. The plug and plastic material are cooled uniformly, as shown in FIG. 9 after which the plug and plastic map are removed from the oven, and the plastic hemisphere, now of the correct diameter, is separated from the plug form. Any excess ink is carefully wiped away after the oven is cooled. The ink that has permeated into the plastic hemisphere forming the map information can now be projected onto a screen or similar device.

This process results in vivid colors permanently set into the material itself, rather than painted thereon, as was true of prior methods. Fading or discoloration no longer occurs. Further, the outer surface is clear and information may be drawn with a grease pencil on the plastic outer surface without danger of damage to the globe, as would be the case where a map is painted on the external surface of the globe. The penciled information is readily erased, and the globe is ready for use in another problem.

An additional advantage resulting from the plug and vacuum method described above is that a perfectly formed hemisphere is now made possible. Usual methods of forming hemispherical globe halves resulted in the rims of the hemisphere halves being slightly flattened with a prominent bulge occurring at a few inches above the rim, thereby failing to provide the perfectly rounded sphere which is required.

To present the curved surface of the earth on a flat map is not difficult, provided the areas under consideration are small. The mapping of countries, continents or the whole earth by the cartographer is a different matter, and requires some kind of projection.

The geometric straight line is still the shortest distance between two points. Meaningful distances are measured along curves, the arcs of great circles. Knowing the size of the earth, globes and maps are made to true scale. On a globe the scale is constant and is an accurate model of the earth. It is the only possible medium of showing all geographical relations truly. A scale given on a flat map cannot be true everywhere. But globes have their practical drawbacks as they are necessarily limited to scale. Cost and size would be prohibitive, if small areas were to be enlarged. These limitations gave rise to cartography, the making of maps on a flat surface.

The method used to "stretch" or lay out a flat map is by projection of the map—the system by which the gridwork of parallels and meridians is laid out on a piece of paper to represent latitude and longitude. This decides the representation of area as well as shape, distance and direction on the finished map.

The present invention provides a novel process which provides a globe adapted to project information in map demonstrations. The invention is not limited to the described method, but is capable of being carried out by other methods. For example, after the ink has been applied and the stencil heated, the plastic can be cooled and any excess ink be removed. The vacuum step would then follow.

Obviously many modifications and variations of the present invention are possible in the light of the above teachings. It is therefore to be understood that within the scope of the appended claim the invention may be practised otherwise than as specifically described.

What is claimed is:

The method of treating a transparent material to permanently apply map information therein comprising heating a sheet of transparent plastic material, forming a hemisphere of the material, inscribing map information upon said transparent plastic material while said material is heated, allowing the plastic material to cool whereby it assumes the original shape with the map information in distorted form, making a silk screen stencil of the distorted map information, placing the stencil over a fresh sheet of transparent plastic material, applying paint through said stencil onto said plastic material, heating the plastic sheet, paint and stencil together until the paint is absorbed by said plastic material, forming a hemisphere of the heated plastic sheet, cooling the plastic sheet around a mold to permanently retain the hemispherical shape, and wiping any excess paint away.

References Cited in the file of this patent

UNITED STATES PATENTS

| | | |
|---|---|---|
| 701,340 | Henrijean et al. | June 3, 1902 |
| 878,308 | Patesson | Feb. 4, 1908 |
| 2,228,736 | Starworth | Jan. 14, 1941 |
| 2,468,731 | Borkland | May 3, 1949 |
| 2,493,439 | Braund | Jan. 3, 1950 |
| 2,601,700 | Pinsky et al. | July 1, 1952 |
| 2,643,598 | Carroll | June 30, 1953 |
| 2,662,033 | Andrew | Dec. 8, 1953 |
| 2,722,038 | Freund | Nov. 1, 1955 |
| 2,811,744 | Baldanza | Nov. 5, 1957 |
| 2,916,393 | Velonis | Dec. 8, 1959 |

FOREIGN PATENTS

| | | |
|---|---|---|
| 416,350 | Great Britain | Sept. 4, 1934 |